US 6,621,928 B1

(12) United States Patent
Inagaki et al.

(10) Patent No.: US 6,621,928 B1
(45) Date of Patent: Sep. 16, 2003

(54) IMAGE EDGE DETECTION METHOD, INSPECTION SYSTEM, AND RECORDING MEDIUM

(75) Inventors: Daisuke Inagaki, Osaka (JP); Yasuhisa Ikushima, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 09/369,295

(22) Filed: Aug. 6, 1999

(65) Prior Publication Data (65)

(30) Foreign Application Priority Data

Feb. 22, 1999 (JP) .......................... 11-043698

(51) Int. Cl.[7] ............................... G06K 9/48
(52) U.S. Cl. .................. 382/199; 382/141; 382/151; 382/152; 382/266; 382/291; 73/865.8; 348/86; 348/92; 356/237.1
(58) Field of Search ............... 382/108, 141, 382/145–147, 149, 151, 152, 199, 242, 243, 266, 273, 291, 294, 309, 274; 73/865.8; 348/86, 92, 125, 126; 356/237.1, 237.3, 238.3, 239.8, 241.1

(56) References Cited

U.S. PATENT DOCUMENTS

| | | | | |
|---|---|---|---|---|
| 4,410,278 A | * | 10/1983 | Makihira et al. ............ 356/445 |
| 4,642,813 A | * | 2/1987 | Wilder ....................... 382/147 |
| 4,947,323 A | * | 8/1990 | Smith ......................... 382/132 |
| 5,003,615 A | * | 3/1991 | Seitz .......................... 382/108 |
| 5,081,689 A | * | 1/1992 | Meyer et al. ............... 382/199 |
| 5,189,710 A | * | 2/1993 | Holt ........................... 382/273 |
| 5,574,800 A | * | 11/1996 | Inoue et al. ................ 382/149 |
| 5,734,739 A | * | 3/1998 | Sheehan et al. ........... 382/128 |
| 5,737,441 A | * | 4/1998 | Nishi ......................... 382/151 |
| 5,969,273 A | * | 10/1999 | Archie et al. .............. 73/865.8 |
| 5,974,169 A | * | 10/1999 | Bachelder ................... 382/151 |
| 6,094,508 A | * | 7/2000 | Acharya et al. ........... 382/199 |

OTHER PUBLICATIONS

Morris, et al "Analog VLSI Circuits for Manufacturing Inspection", IEEE, pp. 241–255, 1995.*

* cited by examiner

Primary Examiner—Daniel G. Mariam
(74) Attorney, Agent, or Firm—Morgan, Lewis & Bockius LLP (57) ABSTRACT

An inspection system which includes a memory for storing image data provided by picking up an image of a workpiece, a monitor for displaying the image data stored in the memory on a display screen with pixels arranged in an X-axis direction and a Y-axis direction perpendicular to the X-axis direction, a control panel for setting a window with four sides along the X- or Y-axis direction on the display screen, and an edge detection section for integrating the lightness values of the pixels with respect to each pixel string arranged in the Y- or X-axis direction in the setup window, and detecting as an edge the position in the X- or Y-axis direction corresponding to the maximum value of the portion where the absolute value of the differential operation result in the X- or Y-axis direction, of the integration result is equal to or greater than a threshold value.

11 Claims, 9 Drawing Sheets

IMAGE EDGE DETECTION METHOD, INSPECTION SYSTEM, AND RECORDING MEDIUM

BACKGROUND OF THE INVENTION

1. Field of the Invention

This invention relates to an inspection system for detecting edges of an inspection object in image data provided by an image pickup machine for imaging the inspection object, thereby measuring the size of the inspection object, for example, the external or internal dimension thereof and arrangement pitches of pins, or the like, arranged at equal intervals, and to an image edge detection method on which such inspection is predicated. It also relates to a recording medium recording therein a computer program for realizing such an inspection system on a general-purpose computer.

2. Description of the Related Art

An inspection system has already come into common use, wherein a product moving on a manufacturing line is imaged by an image pickup machine as an inspection object, which will be hereinafter referred to as a workpiece, and image data provided by picking up the image is processed to find the feature amounts thereof, thereby conducting various inspections on the workpiece, for example, determining whether or not the shape of the workpiece is good, dimensional accuracy, whether or not surface discontinuity exists, and whether or not painting or printing is good. The inspection of the dimensional accuracy requires processing of detecting edges from the image data and locating the positions of the edges. Two or more edges are specified on the screen displaying the detected edges and the inspection system is caused to measure the distance therebetween, whereby the inspection purpose is accomplished; at the time, the edges are specified on the screen by the operator with a pointer or a window is set so as to contain the target edges.

On the other hand, to detect edges in the image data as a prerequisite for the inspection as described above, the operator needs to set sensitivity. The sensitivity described here refers to the sensitivity to be set for detecting edges in response to the lightness difference in the image data, namely, is a value as a threshold value of the lightness difference between pixels in actual data processing. Therefore, the operator causes the inspection system to pick up an image of a workpiece and detect edges in a state in which one sensitivity is set. If the result is improper, the operator changes the setup sensitivity, then again causes the inspection system to pick up an image of the workpiece and detect edges; the operator repeats the operation sequence. After edges are properly detected, the operator specifies the edges to be-measured on the screen and causes the inspection system to execute final measurement, for example, measurement of the external and internal dimensions of the workpiece and pitches.

Thus, with the conventional inspection system, whenever edges are not detected properly, it is necessary to change the setup sensitivity and again pick up an image of the inspection object; the time required for the inspection is prolonged. After edges are detected properly, still the operator needs to specify which edges are to be inspected, thus the work is intricate and is hard to carry out for a beginner.

SUMMARY OF THE INVENTION

It is therefore an object of the invention to provide an inspection system for enabling edge detection based on different sensitivities simply by once picking up an image of a workpiece and minimizing edge specification required for inspection for improving convenience of operation, an edge detection method, and a recording medium recording therein a computer program for realizing such an inspection system on a general-purpose computer.

In order to achieve the above object, according to a first aspect of the invention, there is provided an image edge detection method comprising: a first step of storing image data provided by picking up an image of an inspection object in storage means; a second step of displaying the image data stored in the storage means on a display screen with pixels arranged in an X-axis direction and a Y-axis direction perpendicular to the X-axis direction; a third step of setting an edge detection range with four sides along the X- or Y-axis direction on the display screen; a fourth step of integrating values concerning lightness values of pixels with respect to each pixel string arranged in the Y- or X-axis direction in the setup detection range; and a fifth step of detecting as an edge a position in the X- or Y-axis direction corresponding to a maximum value of a portion where an absolute value of a differential operation result in the X- or Y-axis direction, of the integration result of the values concerning the lightness values is equal to or greater than a threshold value.

According to a second aspect of the invention, there is provided an inspection system for detecting edges according to a threshold value set from an outside in an edge detection range set on an image of an inspection object displayed on a display screen of a display unit and inspecting the inspection object based on the detected edges, wherein if the threshold value is changed, edge detection is again executed according to a new setup threshold value and the edge detection result is displayed on the display screen of the display unit.

According to a third aspect of the invention, there-is provided an inspection system for measuring the distance between two edges nearest to both end parts in an X- or Y-axis direction, of edges detected in an edge detection range set on an image of an inspection object displayed on a display screen of a display unit as an external dimension of the inspection object.

According to a fourth aspect of the invention, there is provided an inspection system, if the number n of edges detected in an edge detection range set on an image of an inspection object displayed on a display screen of a display unit is even, for measuring the distance between a (n/2)-th edge from one end in an X- or Y-axis direction and a next edge as an internal dimension of the inspection object or if the number n of edges detected in the edge detection range is odd, for measuring the distance between a {(n−1)/2}-th edge from one end in the X- or Y-axis direction and a next edge or between a {(n+1)/2}-th edge from one end in the X- or Y-axis direction and a next edge as the internal dimension of the inspection object.

According to a fifth aspect of the invention, there is provided an inspection system, if one end of an edge detection range in an X- or Y-axis direction thereof set on an image of an inspection object comprising a plurality of bar-like patterns arranged in parallel in the X- or Y-axis direction, displayed on a display screen of a display unit is placed out of the bar-like pattern, with the area between each (odd number)-th edge from the one end side of the edge detection range and a next edge as a pattern image, the inspection system for measuring the width of each pattern and the distance between centers of the patterns, or if one end of the edge detection range in the X- or Y-axis direction is placed on one bar-like pattern, with the area between each (odd number)-th edge from the one end side of the edge detection range and a next edge as a gap image between patterns, the inspection system for measuring the width of each gap and the distance between centers of the gaps.

According to a sixth aspect of the invention, there is provided an inspection system comprising: storage means for storing image data provided by picking up an image of an inspection object; display means for displaying the image data stored in the storage means on a display screen with pixels arranged in an X-axis direction and a Y-axis direction perpendicular to the X-axis direction; detection range setting means for setting an edge detection range with four sides along the X- or Y-axis direction on the display screen of the display means; and edge detection means for integrating values concerning lightness values of pixels with respect to each pixel string arranged in the Y- or X-axis direction in the detection range set by the detection range setting means and detecting as an edge a position in the X- or Y-axis direction corresponding to a maximum value of a portion where an absolute value of a differential operation result in the X- or Y-axis direction, of the integration result is equal to or greater than a threshold value.

According to a seventh aspect of the invention, there is provided a recording medium recording therein a computer program for causing a computer to detect edges from image data provided by picking up an image of an inspection object, the computer program comprising: first computer-readable program code means for causing the computer to store the image data provided by picking up the image of the inspection object; second computer-readable program code means for causing the computer to display the stored image data on a display screen with pixels arranged in an X-axis direction and a Y-axis direction perpendicular to the X-axis direction; third computer-readable program code means for causing the computer to set an edge detection range with four sides along the X- or Y-axis direction on the display screen; fourth computer-readable program code means for causing the computer to integrate values concerning lightness values of pixels with respect to each pixel string arranged in the Y- or X-axis direction in the setup detection range; and fifth computer-readable program code means for causing the computer to detect as an edge a position in the X- or Y-axis direction corresponding to a maximum value of a portion where an absolute value of a differential operation result in the X- or Y-axis direction, of the integration result of the values concerning the lightness values is equal to or greater than a threshold value.

DETAILED DESCRIPTION OF THE PREFERRED EMBODIMENT

Figure 1:
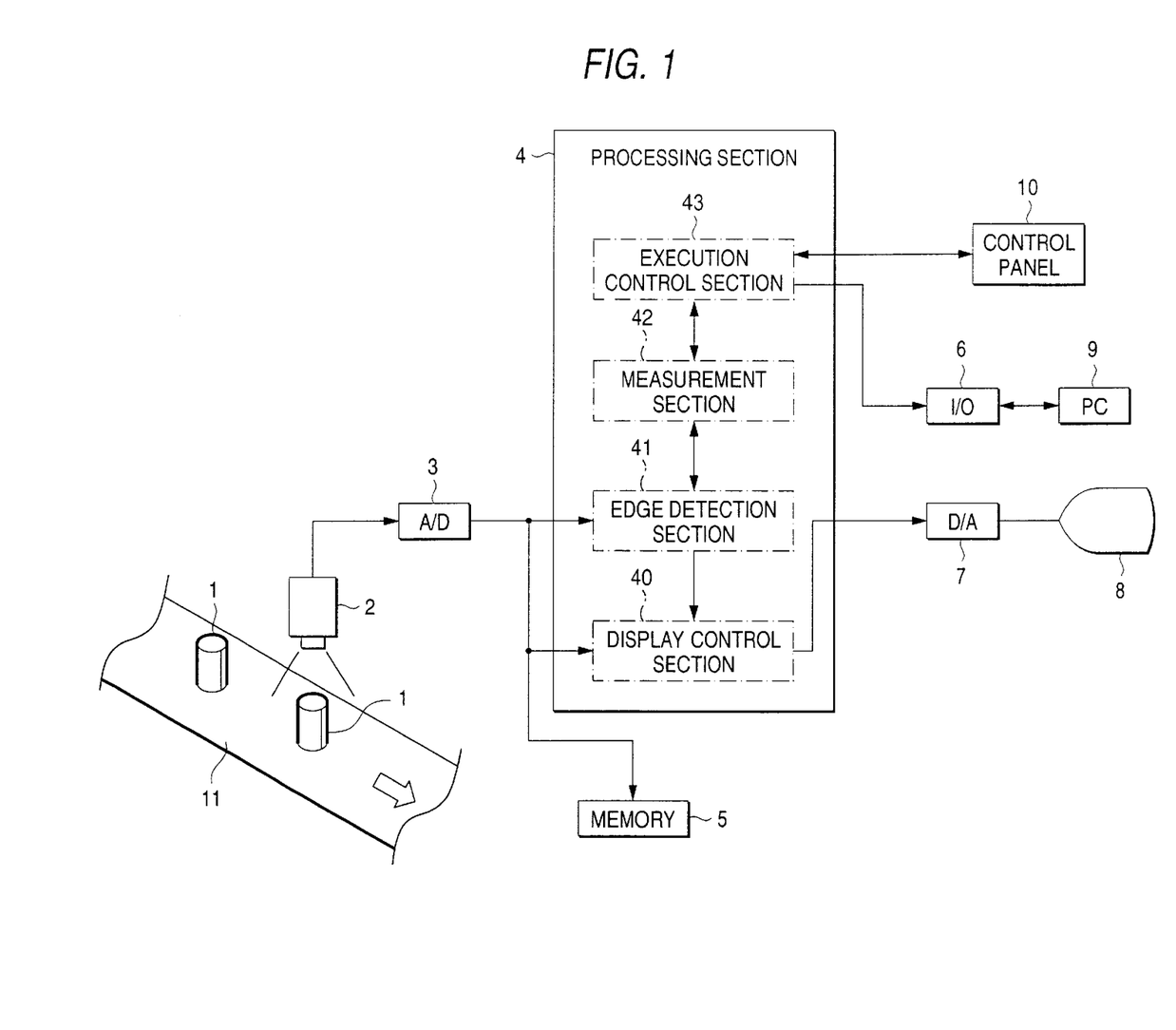
FIG. 1 is a block diagram to show a configuration example of an inspection system according to the invention.

Referring now to the accompanying drawings, there is shown a preferred embodiment of the invention. FIG. 1 is a block diagram to show a configuration example of an inspection system according to the invention.

Inspection objects (which will be hereinafter referred to as workpieces) 1 move consecutively in the arrow direction on a belt conveyor 11. Images of the workpieces 1 are picked up by an image pickup machine 2 such as a CCD camera and the image data is converted into digital image data by an analog-digital converter (A/D) 3, then the digital image data is input to a processing section 4. The embodiment assumes that the workpiece 1 is a columnar object.

The processing section 4 is a main body of the inspection system of the invention, made of a microprocessor. It comprises the functional sections of a display control section 40 for controlling image display, an edge detection section 41 functioning as edge detection means for performing operations by a CPU (central processing unit) to detect edges, a measurement section 42 functioning as measurement means for measuring each workpiece 1 based on the result of edge detection executed by the edge detection section 41, and an execution control section 43 for causing the edge detection section 41 and the measurement section 42 to perform various operations and controlling the whole inspection system of the invention.

The digital image data input from the A/D 3 to the processing section 4 undergoes preprocessing, such as image correction of exposure correction, or the like, conversion to monochrome image data, namely, conversion to image data provided by extracting only Y values representing the lightness, and correction of relative position in field of view of image of workpiece 1, and the resultant data is once stored in memory 5. The memory 5, which is a normal RAM (random-access memory), functions as image data storage means for temporarily storing image data and also temporarily stores data required for various types of processing performed by the processing section 4. The image data of the workpiece 1 stored in the memory 5 is read by the display control section 40 and is converted into an analog image signal by a digital-analog converter (D/A) 7, then is displayed on a monitor 8 of display means.

The edge detection section 41 executes edge detection on the image data stored in the memory 5 according to a processing procedure described later in response to the sensitivity given under the control of the execution control section 43 and temporarily stores the result in the memory 5 and also gives the result to the display control section 40 for superimposing the result on the image of the workpiece 1 displayed on the monitor 8. To execute the edge detection, as the image data of the workpiece 1 stored in the memory 5, the once picked-up image data at the beginning is used as it is, and edge detection based on different sensitivity is again executed. The measurement section 42 measures the external dimensions, internal dimensions, pitches, and the like, as described later under the control of the execution control section 43 based on the edge positions detected by the edge detection section 41.

Reference numeral 10 denotes a control panel for manually controlling the inspection system. The control panel 10 is used to set the sensitivity of edge detection executed by the edge detection section 41, give an instruction for starting execution of edge detection processing according to each setup sensitivity, and set the measurement mode of the external dimensions, internal dimensions, pitches, and the like, for the measurement section 42. The control panel 10 also functions as detection range setting means for specifying the range in which the edges are to be detected by setting a window as the edge detection range on the screen of the monitor 8. To use the control panel 10 to perform the operation as described above, an appropriate screen is displayed on the monitor 8 accordingly.

Reference numeral 6 denotes an interface (I/O) for connecting a personal computer 9. The I/O 6 is used to set the edge detection and measurement modes set through the control panel 10 described above from the personal computer 9 rather than through the control panel 10. It is also used to control automatic operation after various settings are made.

Figure 2:
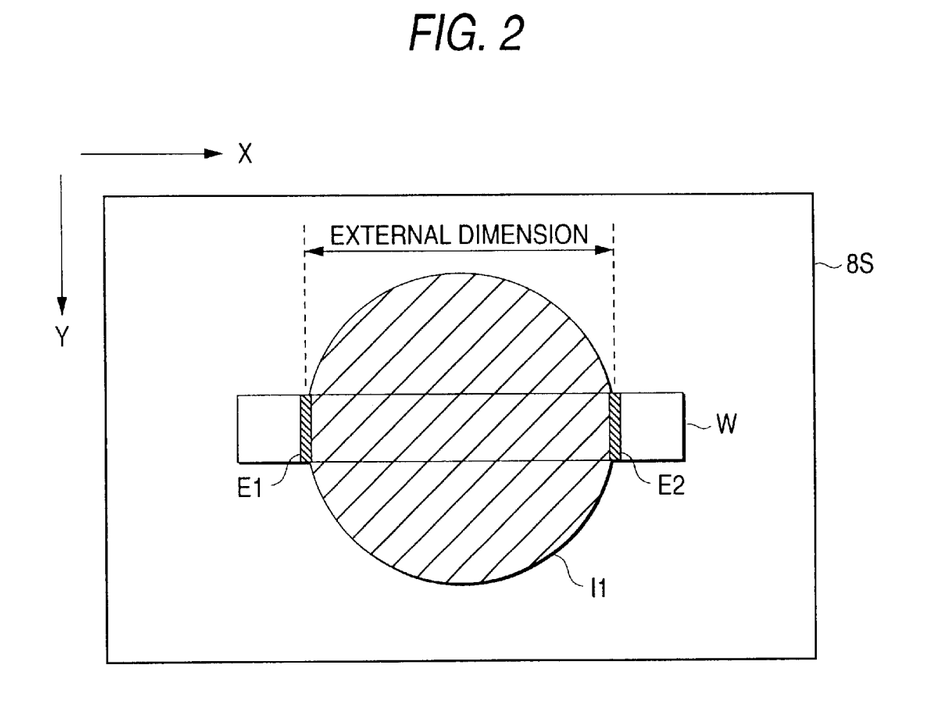
FIG. 2 is a schematic diagram of a display screen of the inspection system according to the invention.

Next, the operation of the above-described inspection system of the invention will be discussed. FIG. 2 is a schematic diagram of a display screen of the monitor 8; an X-Y coordinate system having the upper-left corner as the origin assuming the X direction from side to side and the Y direction from top to bottom is set on the display screen 8S of the monitor 8.

First, to measure the external dimension of the workpiece 1 in a state in which an image I1 of an end face of the workpiece 1, which is circular, is displayed at the center of the screen 8S of the monitor 8 as shown in the schematic diagram of FIG. 2, a window W is set to a rectangle long in the X direction so as to contain the center of the circular image I1 by operating the control panel 10. However, the window may be set to a rectangle long in the Y direction. If an instruction is given for edge detection in the X direction, namely, in the length direction of the window W, processing of detecting edges is executed with the origin side (left) as the starting point in the X direction in the window W.

Taking measurement of the external dimension shown in FIG. 2 as an example, edge detection processing will be discussed with reference to FIG. 3, which is a flowchart. The following description assumes that the image of the workpiece 1 has already picked up by the image pickup machine 2 and the image data thereof has been stored in the memory 5.

If an edge detection instruction is given by operating the control panel 10, the execution control section 43 first checks whether or not sensitivity has been changed at step S11. However, the sensitivity set on the control panel 10 is read at the beginning when the edge detection processing is started. Next, the execution control section 43 updates the threshold value for image data processing, particularly for edge detection to the value responsive to the sensitivity set on the control panel 10 at step S12 and controls the display control section 40 for redisplaying the image of the workpiece 1 stored in the memory 5 on the monitor 8 at step S13.

Next, the edge detection section 41 performs operations. Specifically, first the edge detection section 41 performs differential operation processing at step S15 while reading the lightness values of the pixels contained in the window W in the image data stored in the memory 5 at step S14. Specifically, the edge detection section 41 performs in the X direction, processing of sequentially reading the lightness values of the pixels on each line in the Y direction contained in the window W in the image data stored in the memory 5 from the origin side and integrating the lightness values in line units. At this time, the edge detection section 41 performs differential operation processing between integration values in the X direction. If the absolute value of the result is equal to or greater than the threshold value previously updated at step S12 (YES at step S16), in other words, if the change degree of the integration values of the lightness values of the pixels on the lines in the Y direction is equal to or greater than the threshold value, the edge detection section 41 stores position information in the X direction of the line corresponding to the maximum value of that portion in the memory 5 at step S17.

By performing such processing, the position of the maximum value of the portion where the absolute value of the lightness value is equal to or greater than the threshold value in the specified direction (X direction) is detected in the window W set on the screen 8S of the monitor 8, and the position (pixel unit) in the specified direction (X direction) is stored in the memory 5 as the edge position.

Upon completion of the operation processing on all pixels in the window W in the image data stored in the memory 5 (YES at step S18), the edge detection section 41 displays the detection result stored in the memory 5 on the monitor 8 at step S19. Specifically, the display control section 40 superimposes a line in a preset specific color on the position detected as each edge exists in the window on the image of the workpiece 1, as described above. If the operator visually checks the edge detection result displayed on the monitor 8 and judges that the setup sensitivity is proper, specifically, that the edges required for inspection are detected and that edges which should not essentially exist and edges which may get in the way of inspection are not detected, he or she operates the control panel 10 to give an instruction for determining the sensitivity. Then, the threshold value for data processing is determined (YES at step S20), thus the processing terminates.

However, if the operator visually checks the edge detection result displayed on the monitor 8 and judges that the setup sensitivity is improper, specifically, that the edges required for inspection are not detected and that edges which should not essentially exist are detected, he or she operates the control panel 10 to give an instruction for changing the sensitivity. Then, the threshold value for data processing is changed (NO at step S20), thus control is returned to step S11.

After control is thus returned to step S11, if the operator operates the control panel 10 to change the setup sensitivity (YES at step S11), the execution control section 43 updates the threshold value set so far to the threshold value corresponding to the new sensitivity set through the control panel 10 at step S12, then controls the display control section 40 for again reading the image data of the workpiece 1 stored in the memory 5 and displaying the image on the monitor 8 at step S13. Therefore, at this point of time, the edges detected according to the preceding setup sensitivity and previously displayed on the monitor 8 disappear and only the image of the workpiece 1 is displayed.

Steps S14 to S20 are repeated as described above, whereby edges are detected at positions different from those at the preceding time and the previously detected edge may not be detected. The operator causes the inspection system to repeat edge detection processing while changing the setup sensitivity by operating the control panel 10 until the proper edge detection result is provided.

As a result of executing proper edge detection as described above, if measurement of the external dimension is specified, the operator needs to set the sensitivity so that at least two edges E1 and E2 are detected as shown in FIG. 2. If the two edges E1 and E2 are detected by the edge detection section 41, the measurement section 42 performs processing as shown in a flowchart of FIG. 4 for measuring the external dimension of the workpiece 1. First, the measurement section 42 reads the positions of the two edges E1 and E2 on both outer sides from among the edge positions stored in the memory 5 at step S31, then finds a difference therebetween at step S32, converts the found difference into an actual dimension as required at step S33, and displays the result on the monitor 8 at step S34.

Figure 4:
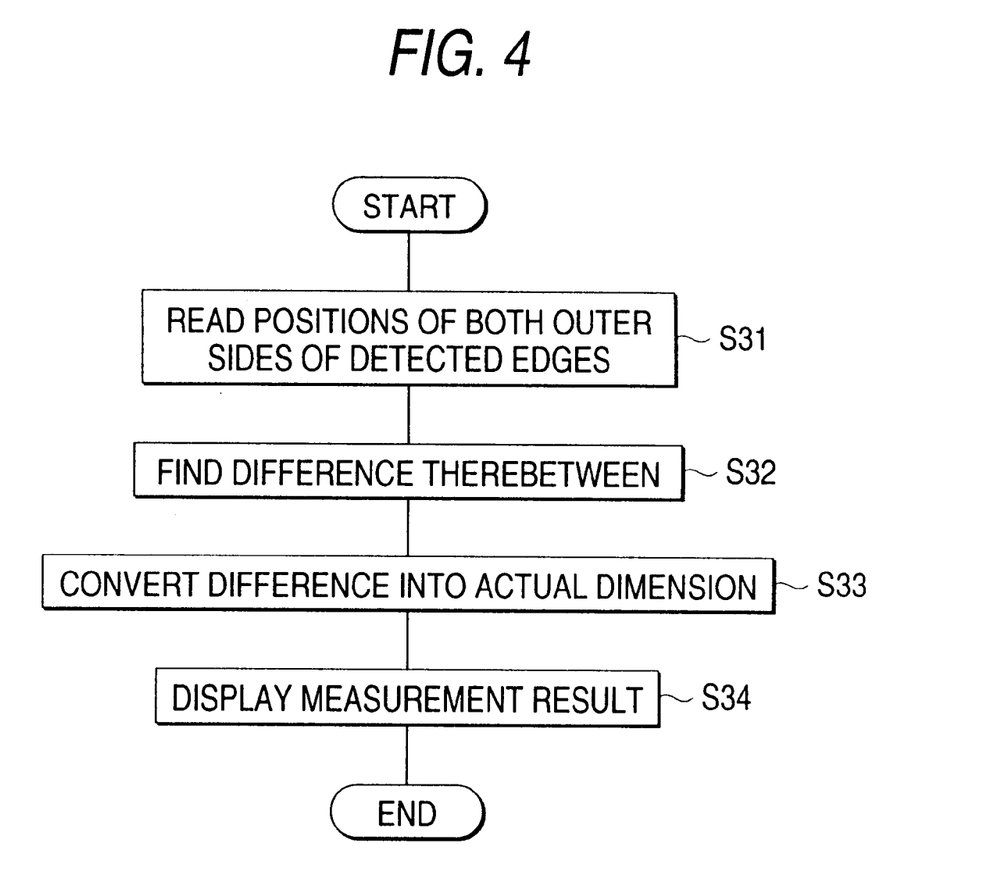
FIG. 4 is a flowchart to show a measurement procedure of the inspection system according to the invention after edge detection.

If another edge is detected between the edges E1 and E2 on both outer sides as a result of the processing of the measurement section 42, the external dimension of the workpiece 1 can also be measured precisely by finding the X-direction distance (the number of pixels) between the edges E1 and E2 on both outer sides in the window W.

Figure 5:
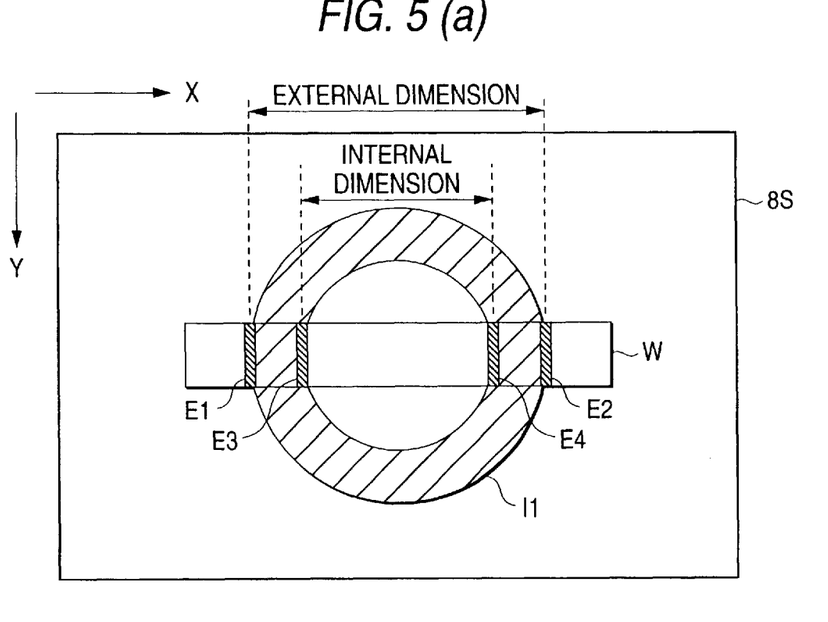
FIGS. 5(a) and 5(b) are schematic diagrams of display screens to show the results of edge detection of the inspection system according to the invention.

By the way, if the workpiece 1 is cylindrical rather than columnar as shown in FIG. 1, when an end face of the workpiece 1 is imaged by the image pickup machine 2, an image of double concentric circles is provided as shown in a schematic diagram of FIG. 5(a) or 5(b). For such an image, it is possible to measure the internal dimension thereof. In this case, the operator needs to set a sensitivity so that at least four edges are detected as shown in FIG. 5(a) by performing proper edge detection processing as described above. In this case, the measurement section 42 measures the external dimension of the workpiece 1 according to the flowchart of FIG. 4 and also measures the internal dimension of the workpiece 1 according to a procedure as shown in a flowchart of FIG. 6.

Figure 6:
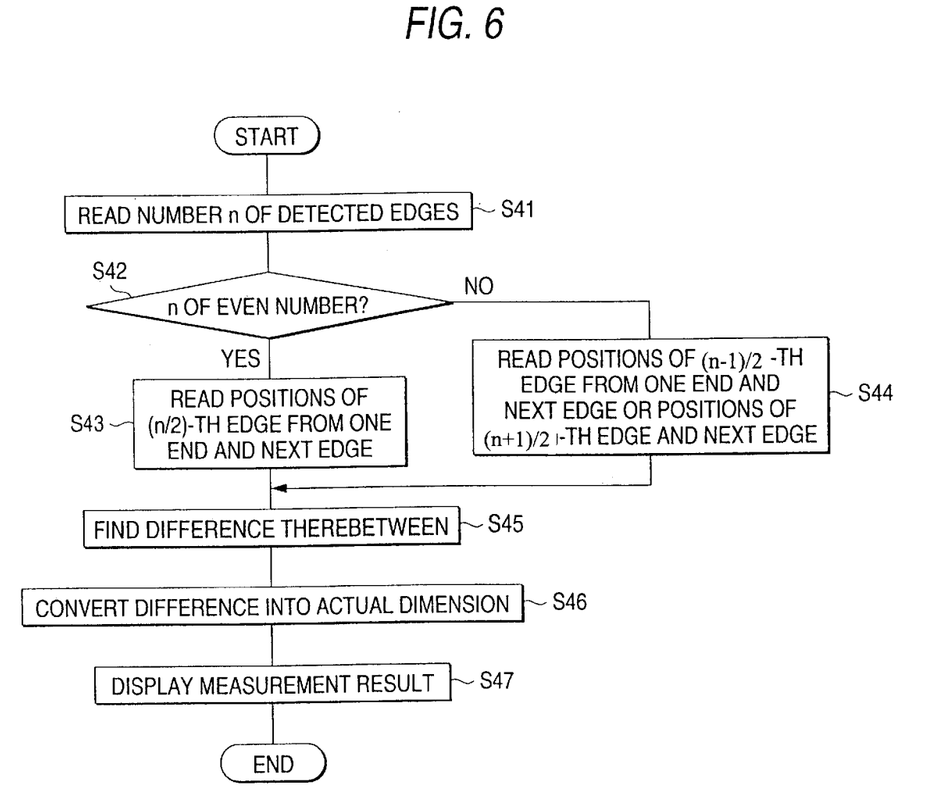
FIG. 6 is a flowchart to show a measurement procedure of the inspection system according to the invention after edge detection.

First, the measurement section 42 reads the number of detected edges, n, from the memory 5 at step S41. If n is an even number (YES at step S42), the measurement section 42 reads the positions of the (n/2)-th edge from the side of one end of the edges stored in the memory 5 and the next edge at step S43, then finds a difference between the positions of both the edges at step S45, converts the found difference into an actual dimension as required at step S46, and displays the result on the monitor 8 at step S47.

However, if an odd number of edges E1 to E5 are detected as shown in FIG. 5(b), the measurement section 42 reads the positions of the {(n−1)/2}-th edge from the side of one end of the edges stored in the memory 5 and the next edge, or the positions of the {(n+1)/2}-th edge from the side of one end and the next edge at step S44. Then, the measurement section 42 finds a difference between the positions both the edges at step S45, converts the found difference into an actual dimension as required at step S46, and displays the result on the monitor 8 at step S47 as in the case described above where the number of edges is even.

Next, in a processing procedure for inspecting the image of the workpiece 1 comprising bar-like patterns arranged in parallel as shown in a schematic diagram of FIG. 7 for the width of each bar-like pattern, the distance between the centers of the bar-like patterns, and the gap width between the bar-like patterns, inspection of the distance between the centers of the bar-like patterns and the distance between the centers of the gaps will be discussed with reference to a flowchart of FIG. 8. The following description and flowchart assume that "n" is a natural number of 1 or more.

Figure 7:
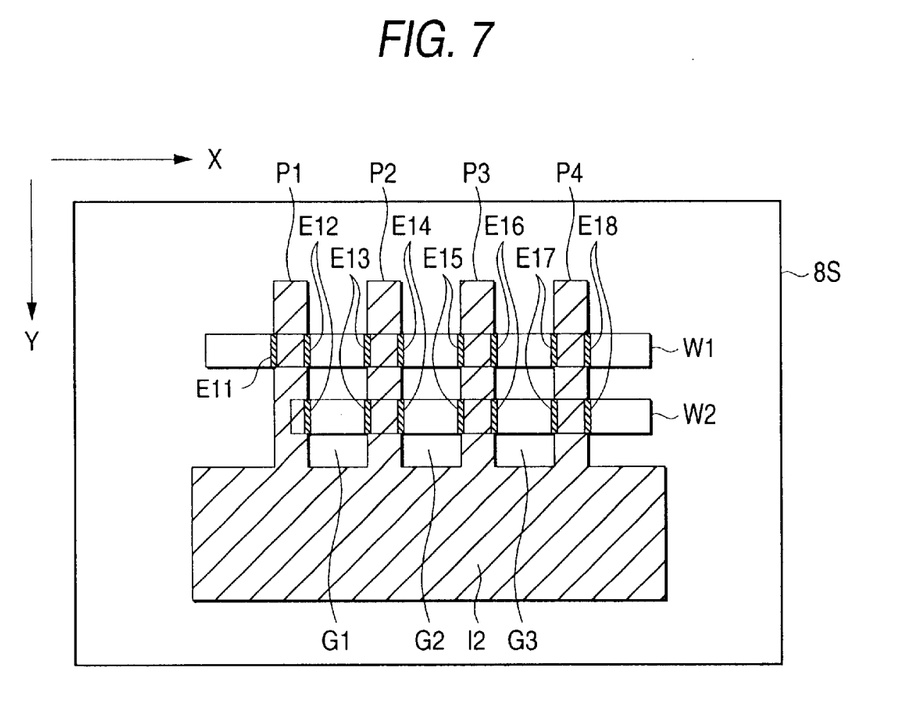
FIG. 7 is a schematic diagram of a display screen of the inspection system according to the invention.
Figure 8:
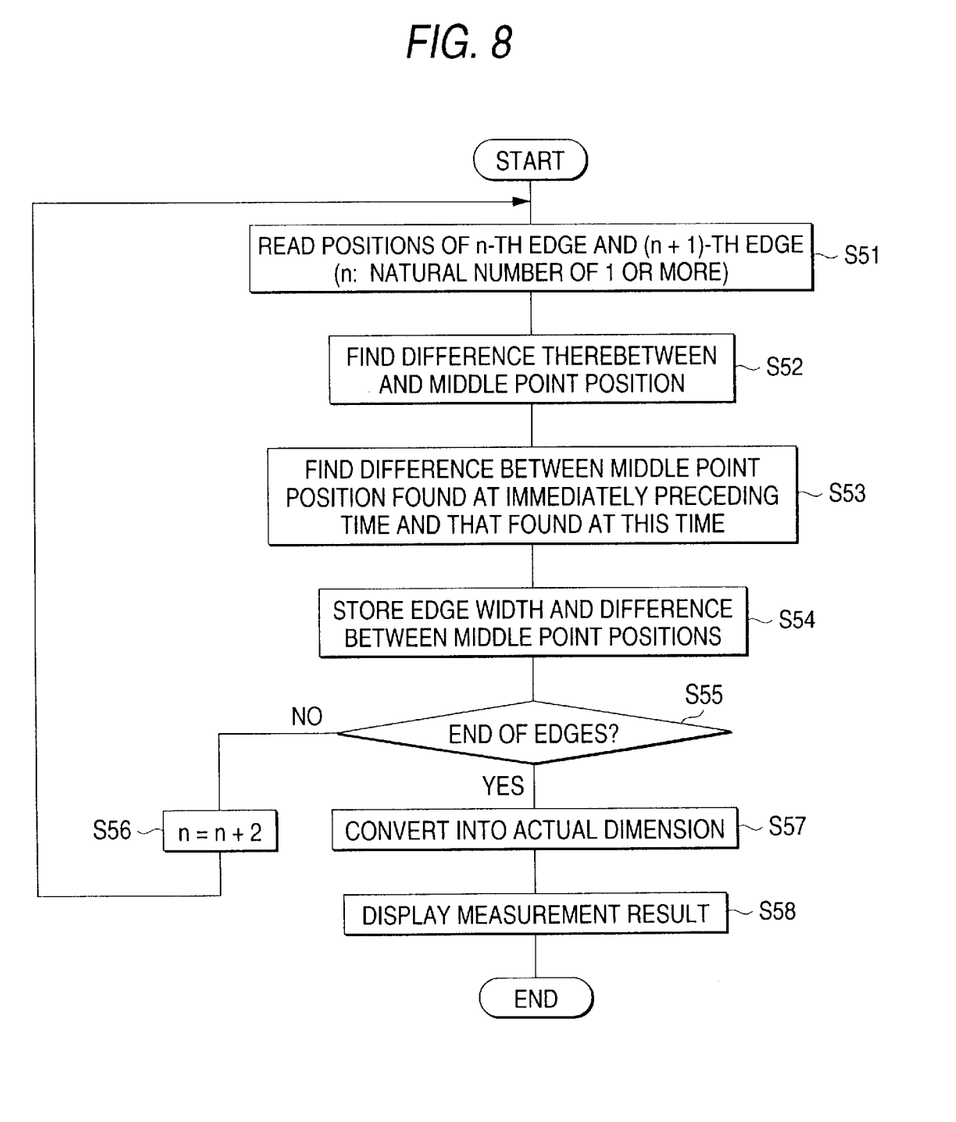
FIG. 8 is a flowchart to show a measurement procedure of the inspection system according to the invention after edge detection.

Assume that a window W1 is set so as to cross four bar-like patterns P1 to P4 and a proper sensitivity is set, whereby edges E11 and E12, E13 and E14, E15 and E16, and E17 and E18 on both sides of the bar-like patterns P1 to P4 has been already detected, as shown in FIG. 7.

First, the measurement section 42 reads the positions of the n-th edge and the (n+1)-th edge from the memory 5 at step S51 and finds a difference between the edges and the position of the middle point of the edges at step S52. Specifically, first the measurement section 42 finds the distance between the first edge E11 and the second edge E12 and the position of the middle point of the first and second edges, namely, the X-direction width and the center position of the bar-like pattern P1.

Next, the measurement section 42 finds a difference between the middle point position found at the immediately preceding time and that found at this time, thereby finding the distance between the centers of two bar-like patterns at step S53. However, at the beginning, processing is performed only for the first bar-like pattern P1, thus this step is skipped. Next, the measurement section 42 stores the distance between the edges (the width of the bar-like pattern) and the distance between the centers of the bar-like patterns separately in the memory 5 as the operation results at step S54. Then, n is incremented by two at step S56, namely, the edge number is incremented by two and above-described steps S51 to S54 are repeated (NO at step S55). Likewise, the above-described processing is performed for all detected edges (YES at step S55). The results are converted into actual dimensions as required at step S57 and the results are displayed on the monitor 8 at step S58.

Therefore, next, the measurement section 42 finds the distance between the third edge E13 and the fourth edge E14 and the position of the middle point of the third and fourth edges, namely, the X-direction width and the center position of the bar-like pattern P2. Likewise, the measurement section 42 finds the distance between the fifth edge E15 and the sixth edge E16 and the position of the middle point of the fifth and sixth edges, namely, the X-direction width and the center position of the bar-like pattern P3 and the distance between the seventh edge E17 and the eighth edge E18 and the position of the middle point of the seventh and eighth edges, namely, the X-direction width and the center position of the bar-like pattern P4.

Resultantly, the widths of the bar-like patterns P1, P2, P3, and P4 and the distance between the centers of the bar-like patterns P1 and P2, that between the centers of the bar-like patterns P2 and P3, and that between the centers of the bar-like patterns P3 and P4 are found. Processing of displaying the results on the monitor 8 or determining whether or not each value is within a preset tolerance and displaying the result, and the like, may be performed, needless to say.

On the other hand, as shown in FIG. 7, a window W2 is set so as to cross the three bar-like patterns P2 to P4 with one end of the window W2 positioned in the bar-like pattern P1 and a proper sensitivity is set, whereby if one edge E12 of the bar-like pattern P1 and the edges E13 and E14, E15 and E16, and E17 and E18 on both sides of the bar-like patterns P2 to P4 have been already detected, the widths of gap G1 between the bar-like patterns P1 and P2, gap G2 between the bar-like patterns P2 and P3, and gap G3 between the bar-like patterns P3 and P4, and the distance between the centers of the gaps are measured.

First, the measurement section 42 reads the positions of the n-th edge and the (n+1)-th edge from the memory 5 at step S51 and finds a difference between the edges and the position of the middle point of the edges at step S52. If the window W2 is set as shown in FIG. 7, first the measurement section 42 finds the distance between the second edge E12 and the third edge E13 and the position of the middle point of the second and third edges, namely, the X-direction width and the center position of the gap G1 between the bar-like patterns P1 and P2.

Next, the measurement section 42 finds a difference between the middle point position found at the immediately preceding time and that found at this time, thereby finding the distance between the centers of two gaps at step S53. However, at the beginning, processing is performed only for the first gap G1 (gap between bar-like patterns P1 and P2), thus this step is skipped. Next, the measurement section 42 stores the gap width (between the edges) and the distance between the centers of the gaps separately in the memory 5 as the operation results at step S54. Then, n is incremented by two at step S56, namely, the edge number is incremented by two and above-described steps S51 to S54 are repeated (NO at step S55). Likewise, the above-described processing is performed for all detected edges (YES at step S55). The results are converted into actual dimensions as required at step S57 and the results are displayed on the monitor 8 at step S58.

Therefore, next, the measurement section 42 finds the distance between the fourth edge E14 and the fifth edge E15 and the position of the middle point of the fourth and fifth edges, namely, the X-direction width and the center position of the gap G2 between the bar-like patterns P2 and P3. Likewise, the measurement section 42 finds the distance between the sixth edge E16 and the seventh edge E17 and the position of the middle point of the sixth and seventh edges, namely, the X-direction width and the center position of the gap G3 between the bar-like patterns P3 and P4.

Resultantly, the widths of the gap G1 between the bar-like patterns P1 and P2, the gap G2 between the bar-like patterns P2 and P3, and the gap G3 between the bar-like patterns P3 and P4, and the distance between the centers of the gaps G1 and G2 are found. Processing of displaying the results on the monitor 8 or determining whether or not each value is within a preset tolerance and displaying the result, and the like, may be performed, needless to say.

Thus, in the invention, if a window is set so that one end of the window is placed out of a bar-like pattern, the width of each bar-like pattern and the distance between the centers of the adjacent bar-like patterns are automatically measured; if a window is set so that one end of the window is placed on a bar-like pattern, the width of the gap between the adjacent bar-like patterns and the distance between the centers of the adjacent gaps are automatically measured.

In the embodiment, the lightness value itself is used as the value concerning the lightness value of each pixel of the image data, but a value provided by applying a process to the lightness value, for example, a value provided by applying linear or nonlinear conversion processing to the lightness value or a value provided by applying preprocessing for image improvement such as flattering processing of a histogram to the lightness value can also be used.

Further, in the embodiment, the monitor 8 has a capability of color display, but an image for edge detection is displayed in monochrome. However, if an edge position is detected, a line is displayed at the position in a specific color. The window W may also be displayed in a specific color.

Figure 3:
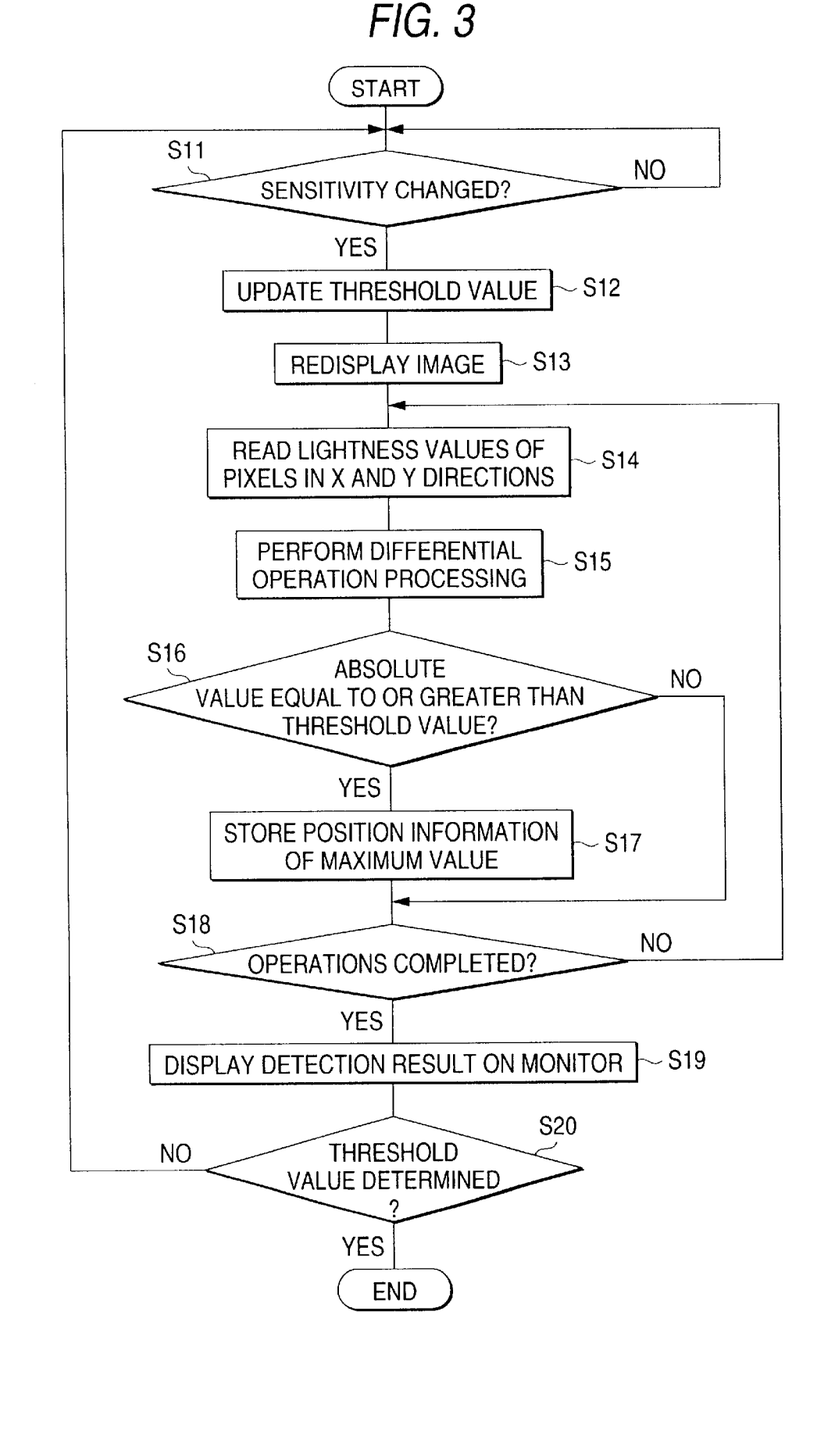
FIG. 3 is a flowchart to show an edge detection procedure of the inspection system according to the invention.

Further, the inspection system of the invention can also be realized by causing a general-purpose computer such as a personal computer to execute a computer program containing the processing procedures shown in-the flowcharts of FIGS. 3, 4, and 6 as program code, needless to say.

Figure 9:
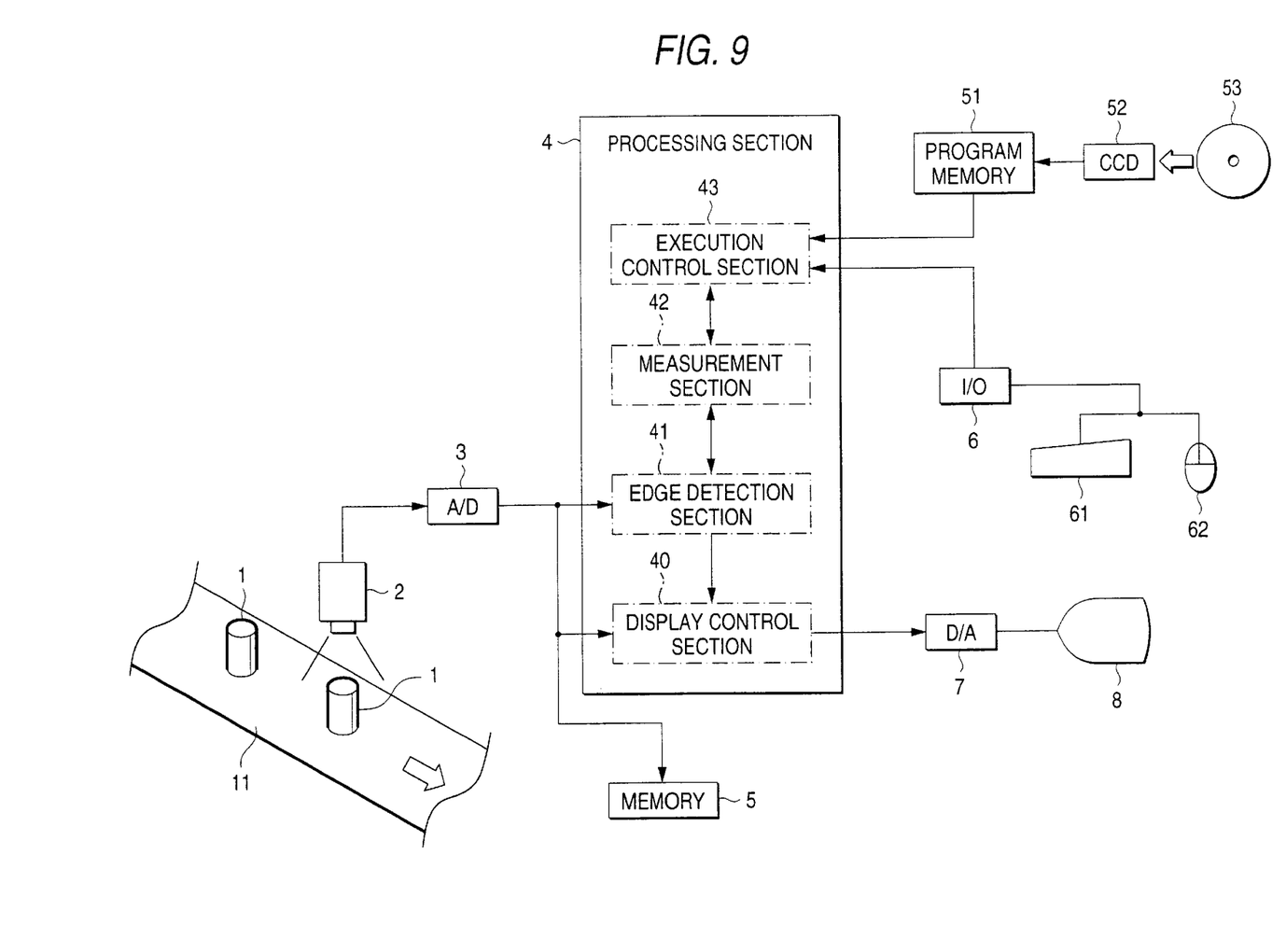
FIG. 9 is a block diagram applied for realizing the inspection system of the invention using a general-purpose computer.

FIG. 9 is a block diagram applied for realizing the inspection system of the invention using such a general-purpose computer. Components identical with or similar to those previously described with reference to FIG. 1 are denoted by the same reference numerals in FIG. 9 and will not be discussed again.

Reference numeral 53 denotes a CD-ROM as a recording medium recording therein the computer program containing the processing procedures shown in the flowcharts of FIGS. 3, 4, and 6 as program code, and reference numeral 52 denotes a CD-ROM drive (CDD) for reading the program code recorded on the CD-ROM 53 and storing the program code in a program memory 51. The program code read from the CD-ROM 53 and stored in the program memory 51 is read by an execution control section 43 in a predetermined order and the processing procedures shown in the flowcharts of FIGS. 3, 4, and 6 are executed.

By providing an appropriate drive in place of the CDD 52, not only the CD-ROM, but also any other recording medium such as a flexible disk can be used as the recording medium, needless to say.

Reference numerals 61 and 62 denote a keyboard and a mouse, respectively, for manually controlling the general-purpose computer in place of the control panel 10 shown in FIG. 1. The keyboard 61 and the mouse 62 are connected through the interface (I/O) 6 to the execution control section 43. Therefore, like the control panel 10, the keyboard 61 and the mouse 62 are used to set the sensitivity of edge detection executed by an edge detection section 41, give an instruction for starting execution of edge detection processing according to each setup sensitivity, and set the measurement mode of the external dimensions, internal dimensions, pitches, and the like, for a measurement section 42. The keyboard 61 and the mouse 62 also function as detection range setting means for specifying the range in which the edges are to be detected by setting a window as the edge detection range on the screen of a monitor 8.

As described above in detail, according to the image edge detection method and the inspection system according to the invention, if the width of the edge detection range set on the image displayed on the display screen is made large, it is made possible to exclude the effect of noise; in contrast, if the width of the edge detection range is made small, it is made possible to detect edges more accurately.

According to the image edge detection method and the inspection system according to the invention, it is made possible to repeat edge detection based on different threshold values for the image data stored in the storage means. Thus, when edges are not detected properly, even if the setup sensitivity is changed, it is not necessary to again pick up an image of the inspection object; the time required for the inspection can be shortened.

According to the image edge detection method and the inspection system according to the invention, the external dimension of the inspection object can be easily measured simply by setting a detection area and can be precisely measured even if an unnecessary edge is detected in the area.

According to the image edge detection method and the inspection system according to the invention, the internal dimension of the inspection object can be easily measured simply by setting a detection area.

According to the image edge detection method and the inspection system according to the invention, for the inspection object comprising bar-like patterns arranged in parallel, it is made easily possible to measure the width of each pattern and the distance between the centers of the patterns or the width of each gap and the distance between the centers of the gaps depending on the setup position of one end part of the inspection area on the image.

Further, according to the recording medium according to the invention, it is made possible to realize the inspection system as described above on a general-purpose computer.

What is claimed is:

1. An image edge detection method comprising:
   a first step of storing image data provided by picking up an image of an inspection object in storage means;
   a second step of displaying the image data stored in the storage means on a display screen with pixels arranged in an X-axis direction and a Y-axis direction perpendicular to the X-axis direction;
   a third step of setting a rectangle as an edge detection range, wherein each side of the rectangle is along the X-axis- or Y-axis direction on the display screen;
   a fourth step of integrating lightness values of pixels arranged on each line in a first direction in the setup detection range, wherein the first direction is one of the X-axis or the Y-axis direction, thereby obtaining integration values for each line of pixels along the first direction;
   a fifth step of performing a differential operation processing in a second direction on the integration values, wherein the second direction is perpendicular to the first direction, thereby obtaining a plurality of differential values in the second direction; and
   a sixth step of detecting as an edge in the second direction a position at which an absolute value of the differential value is equal to or greater than a threshold value, wherein the threshold value is set so that plural edges are detected whereby the position of each detected edge corresponds to a maximum value of a portion of the image.

2. The image edge detection method as claimed in claim 1, further comprising:
   a seventh step of changing the threshold value before said sixth step;
   an eighth step, if the threshold value is changed, of causing said sixth step to be again executed according to the changed threshold value and causing the edge detection result to be displayed; and
   a ninth step of causing said seventh and eighth steps to be repeated.

3. The image edge detection method as claimed in claim 1, wherein a distance between two edges nearest to both end parts in the second direction, of the edges detected in the edge detection range is measured as an external dimension of the inspection object.

4. The image edge detection method as claimed in claim 1, wherein if a number n of edges detected in the edge detection range is even, a distance between a (n/2)-th edge from one end in the second direction and a next edge is measured as an internal dimension of the inspection object, or if the number n of edges detected in the edge detection range is odd, the distance between a {(n−1)/2}-th edge; from one end in the second direction and a next edge or between a {(n+1)/2}-th edge from one end in the second direction and a next edge is measured as the internal dimension of the inspection object.

5. The image edge detection method as claimed in claim 1,
   wherein, for an image comprising a plurality of bar-like patterns arranged in parallel in the second direction displayed on the display screen, the position of a middle point is measured for an area between each (odd number)-th edge from one end of the edge detection range and a next edge, a width of said area is measured by measuring the distance between the (odd number)-th edge corresponding to the area and the next edge, and
   if one end of the edge detection range in the second direction is placed out of the bar-like pattern, with the area between each (odd number)-th edge from the end of the edge detection range and a next edge as a pattern image, the width of each pattern and the distance between centers of the patterns are measured, or
   if one end of the edge detection range in the second direction is placed on one bar-like pattern, with the area between each (odd number)-th edge from the end of the edge detection range and a next edge as a gap image between patterns, the width of each gap and the distance between centers of the gaps are measured.

6. An inspection system comprising:
   storage means for storing image data provided by picking up an image of an inspection object;
   display means for displaying the image data stored in said storage means on a display screen with pixels arranged in an X-axis direction and a Y-axis direction perpendicular to the X-axis direction;
   detection range setting means for setting a rectangle as an edge detection range, wherein each side of the rectangle is along the X-axis or Y-axis direction on the display screen of said display means; and
   edge detection means for integrating lightness values of pixels arranged on each line in a first direction in the detection range, thereby obtaining integration values for each line of pixels along the first direction, performing a differential operation processing in a second direction on the integration values, thereby obtaining a plurality of differential values in the second direction, detecting as an edge in the second direction a position at which an absolute value of a differential value is equal to or greater than a threshold value, wherein the first direction is one of the X-axis or the Y-axis direction, the second direction is perpendicular to the first direction, and the threshold value is set so that plural edges are detected whereby the position of each detected edge corresponds to a maximum value of a portion of the image.

7. The inspection system as claimed in claim 6, further comprising:
   display unit means for displaying the detection result of said edge detection means; and
   threshold value setting means for setting the threshold value,
   wherein if the threshold value set by said threshold value setting means is changed, said edge detection means again executes edge detection according to the changed threshold value and causes said display unit means to display the edge detection result.

8. The inspection system as claimed in claim 6, further comprising measurement means for measuring a distance between two edges nearest to both end parts in the second direction, of the edges detected by said edge detection means in the detection range set by said detection range setting means as an external dimension of the inspection object.

9. The inspection system as claimed in claim 6, further comprising measurement means, if a number n of edges detected by said edge detection means in the edge detection range is even, for measuring a distance between a (n/2)-th edge from one end in the second direction and a next edge as an internal dimension of the inspection object, or if the number n of edges detected by said edge detection means in the edge detection range is odd, for measuring the distance between a {(n−1)/2}-th edge from one end in the second direction and a next edge or between a {(n+1)/2}-th edge from one end in the second direction and a next edge as the internal dimension of the inspection object.

10. The inspection system as claimed in claim 6, wherein if an image comprising a plurality of bar-like patterns arranged in parallel in the second direction is displayed on the display screen, further comprising measurement means, if one end of the edge detection range in the second direction is placed out of the bar-like pattern, with an area between each (odd number)-th edge of the edges detected by said edge detection means from the one end side of the edge detection range and a next edge as a pattern image, for measuring a width of each pattern and a distance between centers of the patterns, or     if one end of the edge detection range in the second direction is placed on one bar-like pattern, with the area between each (odd number)-th edge of the edges detected by said edge detection means from one end of the edge detection range and a next edge as a gap image between patterns, for measuring the width of each gap and the distance between centers of the gaps.

11. A recording medium recording therein a computer program for causing a computer to detect edges from image data provided by picking up an image of an inspection object, said computer program comprising:

first computer-readable program code means for causing the computer to store the image data provided by picking up the image of the inspection object;

second computer-readable program code means for causing the computer to display the stored image data on a display screen with pixels arranged in an X-axis direction and a Y-axis direction perpendicular to the X-axis direction;

third computer-readable program code means for causing the computer to set a rectangle as an edge detection range, wherein each side of the rectangle is along the X-axis or Y-axis direction on the display screen;

fourth computer-readable program code means for causing the computer to integrate lightness values of pixels arranged on each line in a first direction in the setup detection range, wherein the first direction is one of the X-axis or the Y-axis direction, thereby obtaining integration values for each line of pixels along the first direction;

fifth computer-readable program code means for causing the computer to perform a differential operation processing in a second direction on the integration values, wherein the second direction is perpendicular to the first direction, thereby obtaining a plurality of differential values in the second direction; and     sixth computer-readable program code means for causing the computer to detect as an edge in the second direction a position at which an absolute value of a differential value is equal to or greater than a threshold value, wherein the threshold value is set so that plural edges are detected whereby the position of each detected edge corresponds to a maximum value of a portion of the image.

* * * * *